US007663546B1

(12) United States Patent
Miyamoto et al.

(10) Patent No.: US 7,663,546 B1
(45) Date of Patent: Feb. 16, 2010

(54) REAL-TIME AUTONOMOUS BEAM STEERING ARRAY FOR SATELLITE COMMUNICATIONS

(75) Inventors: Ryan Y. Miyamoto, Honolulu, HI (US); Derek M. K. Ah Yo, Honolulu, HI (US); Joseph M. Cardenas, Honolulu, HI (US); Donald J. Harbin, Mililani, HI (US); Luke B. Joseph, Honolulu, HI (US); Ken C. K. Cheung, Kailua, HI (US)

(73) Assignee: Oceanit Laboratories, Inc., Honolulu, HI (US)

( * ) Notice: Subject to any disclaimer, the term of this patent is extended or adjusted under 35 U.S.C. 154(b) by 274 days.

(21) Appl. No.: 11/474,126

(22) Filed: Jun. 23, 2006

(51) Int. Cl.
*G01S 13/00* (2006.01)
*H01Q 1/00* (2006.01)

(52) U.S. Cl. ....................................... 342/370; 342/154

(58) Field of Classification Search .................. 342/81, 342/154, 370, 372, 373; 370/281, 282, 295
See application file for complete search history.

(56) References Cited

U.S. PATENT DOCUMENTS

| | | | | |
|---|---|---|---|---|
| 5,848,060 | A * | 12/1998 | Dent | 370/281 |
| 6,373,432 | B1 * | 4/2002 | Rabinowitz et al. | 342/357.16 |
| 2005/0101352 | A1 * | 5/2005 | Logothetis et al. | 455/562.1 |
| 2007/0155314 | A1 * | 7/2007 | Mohebbi | 455/11.1 |

* cited by examiner

*Primary Examiner*—Dao L Phan
(74) *Attorney, Agent, or Firm*—James Creighton Wray; Meera P. Narasimhan

(57) ABSTRACT

A phased array satellite communication (SATCOM) system for ground stations receives information signals and a beam from a satellite and autonomously steers communication signals by phase information toward a satellite extracted from the received satellite beam. The new phased array eliminates the need for phase shifters to control a beam. The new phased array satellite communications system avoids delay in digital signal processing or feedback systems to find satellite locations, enabling autonomous real-time electronic beam steering with no delay. The new system is also used to handle signals from and to multiple satellites simultaneously. The new system is useful in other applications where an enhanced point-to-point communication link is required.

20 Claims, 13 Drawing Sheets

A conceptual diagram of the autonomous beam steering technique (a) receiver (b) transmitter A conceptual diagram of the autonomous beam steering technique (a) receiver (b) transmitter A basic diagram of the array element circuitry
(a) receiver (b) transmitter Multibeam steering array element using the invented technique

Open-Ended Circular Waveguide Antenna

Microstrip-to-Slot Line Transition

Top View

Bottom View

Combined Structure

Antenna Side

Feed Side

Ku-band Phased Array Layers

1. High frequency Rx and TX cards (Up\Down converting, LNA's, PA's)
2. LO and IF distribution layer
3. Rx and Tx, IF phase aligning cards
4. Digital and Power supply layer
5. Rx IF combining, and Tx IF distribution layer

Block Diagram of Ku-band Satcom Array Element

Rx & Tx Frontend

The beacon IF is at the GPS frequency.

(SAW filters are easy to find at that frequency.)

Block Diagram of Ku-band Satcom Array Element

Block Diagram of Ku-band Satcom Array Element

REAL-TIME AUTONOMOUS BEAM STEERING ARRAY FOR SATELLITE COMMUNICATIONS

This invention was made with government support under Contract No. N00014-04-C-0473 awarded by Office of Naval Research, Department of the Navy. The government has certain rights in this invention.

TECHNICAL FIELD OF THE INVENTION

The invention is a satellite communication system used as a ground station to receive and transmit a signal.

BACKGROUND OF THE INVENTION

Satellite communication (SATCOM) has made wireless local area networks (LAN) ubiquitous in a true sense. SATCOM requires the use of high-gain antennas due to its long communication distance. The conventional SATCOM system uses a large dish antenna that can be mechanically controlled to change a beam direction. Planar antennas that can replace dish antennas have been developed. However, mechanical beam control is still required to establish a link between satellite and ground stations.

Phased arrays are very attractive for satellite communications due to their planar structure and agile electronic beam control. There are several approaches to electronically control a beam. The majority of today's phased arrays rely on phase shifters to steer a beam. Although there have been many efforts for cost and size reduction, the phase shifter is still one of the most expensive parts in the SATCOM ground station system. The use of heterodyne scanning eliminates the need for phase shifters. However, the heterodyne scanning technique requires complex local oscillator (LO) networks, making the technique far from practical.

Moreover, beam steering for these approaches requires a priori knowledge of the satellite location or a feedback system to track the satellite using its beacon signal. This is a problem especially when the ground station is on the move. The ground station needs to continuously adjust the elevation and azimuth angles of radiation using peak-search of the beacon signal.

Smart antennas use digital beam-forming (DBF) techniques to overcome this problem, but this requires power-hungry analog-to-digital converters and digital signal processor circuits. Therefore smart antennas are not suited for SATCOM where the array requires a large number of elements. Needs exist for improved satellite communication systems.

These and further and other objects and features of the invention are apparent in the disclosure, which includes the above and ongoing written specification, with the claims and the drawings.

SUMMARY OF THE INVENTION

The invention solves all the problems mentioned. The system was developed for SATCOM applications. However, it can be applied to other applications where a point-to-point link is required. For example, an unmanned aerial vehicle (UAV) requires a high gain antenna due to the limited fuel or battery power on the vehicle. The invented phased array provides real-time beam control that enhances the communication link between the UAV and ground stations. The phase lock loop circuitry in the new system uses arbitrary frequencies within a designated band for receiving and transmitting.

That allows for full-duplex point-to-point communication links to be established using two sets of the invented array, enabling low-power operation of the communication system.

Applications for the new system include:

Naval and ship communications
- The system can be used for ad-hoc networks between ships.

Airborne communications
- The system can be mounted on airplanes for ground-to-air and air-to-air communications.

Sensor Networks
- Sensors have limited battery power. The new system allows efficient communication between sensor nodes which are arbitrarily distributed.

Reconfigurable Lens (RF or Optics)
- The invented system can be used as lens with variable focal points. The array collects power that comes from the beacon direction, and emits power toward the beacon direction.

Laser Communications
Radar
Target tracking
Remote sensing & imaging
Industrial metrology
Ultrasound
Directed energy
Medical imaging
Sonar The new planar phased array antenna system is capable of autonomous beam-steering for both uplink and downlink without relying on digital signal processing. The system takes advantage of a beacon signal sent by a satellite in order to autonomously point a beam directly back at the satellite. Because the beacon and data signals are very close in frequency and illuminate the phased array from the same angle, the geometry phases of the beacon and data signals are the same at each element and can be eliminated by down-converting the data signal using the beacon signal as a local oscillator (LO) signal. The down-converted signals are thus combined in phase without using phase shifters. If the frequency difference between the beacon and communication signals is not negligible, the phase error can be easily compensated using frequency dividers and multipliers. The beacon signal is also used to steer the transmitted signal beam. The transmitting array establishes a beam toward the satellite by up-converting a communication signal using the phase-conjugated beacon signal. As an alternative to using the beacon signal for LO generation the received data signal can be used instead by implementing carrier recovery circuitry. In both cases the beam steering is done autonomously with no delay, because the system does not use any signal processing or feedback control.

The technology has the following characteristics:

1. Simple: The system does not use unconventional components. The system can be realized using economical commercial-off-the-shelf (COTS) components, reducing cost significantly compared to existing conventional phased arrays.
2. Autonomous: Beam steering can be done without a priori knowledge of satellite locations.
3. Real time: The system enables continuous, instantaneous beam steering with no delay.
4. Full Duplex: The system does not have to share a radio frequency (RF) front-end for phase shifting for receiving and transmitting, enabling a full duplex communication.

5. Multi-beam control: Multi-beam control can be accomplished by using beacons at different frequencies, allowing communication with multiple satellites simultaneously.
6. Compatibility: Beam steering is done at an intermediate frequency (IF), providing high compatibility. The same beam steering circuitry can be used regardless of the SATCOM frequency band (L, C, X, Ku, Ka etc . . . )

These and further and other objects and features of the invention are apparent in the disclosure, which includes the above and ongoing written specification, with the claims and the drawings.

DETAILED DESCRIPTION OF THE PREFERRED EMBODIMENTS

Figure 1:
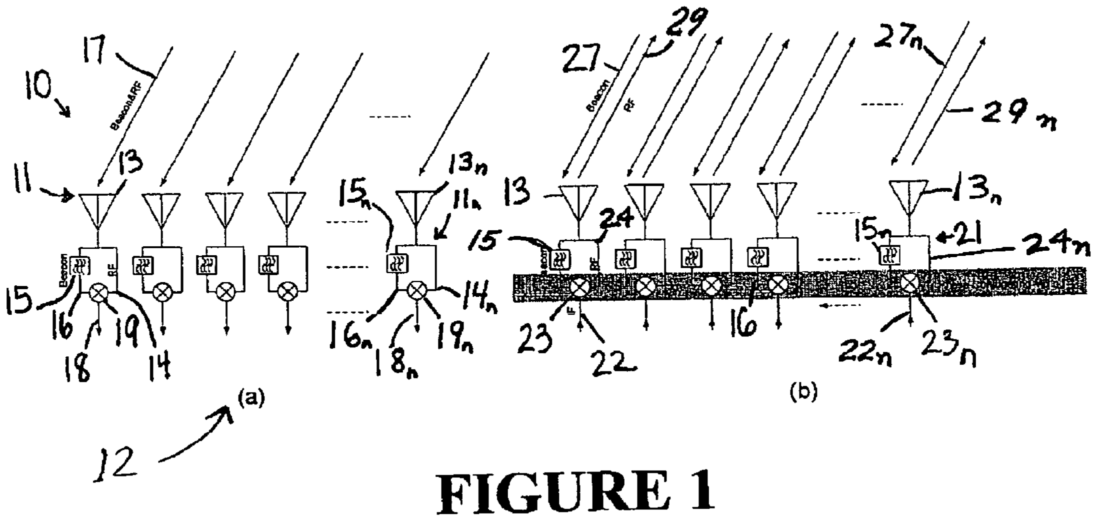
FIG. 1 is conceptual diagrams of receivers and transmitters in the system.

FIG. 1 shows a conceptual diagram of receivers 12 in the new system 10. Each antenna 13 of the receiving array 11 receives beacon and data signals 17 from a satellite. The two signals are mixed to eliminate geometry phase induced by an oblique incidence on the receivers. The beacon signal is separated from the RF signals 14 by a SAW filter 15. The system uses the beacon signal as a local oscillator and provides an output signal 16 to mixer 19. Mixer 19 uses the output signal 16 and the radio frequency (RF) signal 14 to produce an intermediate frequency signal 18 with the information or data from the satellite source of the incoming mixed beacon and information signal 17. Plural receiver array elements 11 . . . 11$_n$ have identical COTS components, such as antennas 13 . . . 13$_n$ and SAW filters 15 . . . 15$_n$.

In the transmitter array 21, the incoming beacon signal 27 is split off by SAW filters 15 and phase-conjugated, and the output 16 is used as a LO signal provided to mixer 23 to up-convert an outbound IF information signal 22 to an outbound RF information signal 24. Signal 24 is amplified and then transmitted by antennas 13-13$_n$ as an uplink RF information signal 29 returned in the direction of beacon 27. Note that the phase of the signal 29 is the conjugation of the beacon signal 27 phase.

As a result, the transmitted signal 29 establishes a beam in the incoming direction of the beacon. Because the system does not rely on signal processing or feed back systems, beam steering is done in real time without any lag. Plural transmitter array elements have identical COTS components and antennas.

Figure 2:
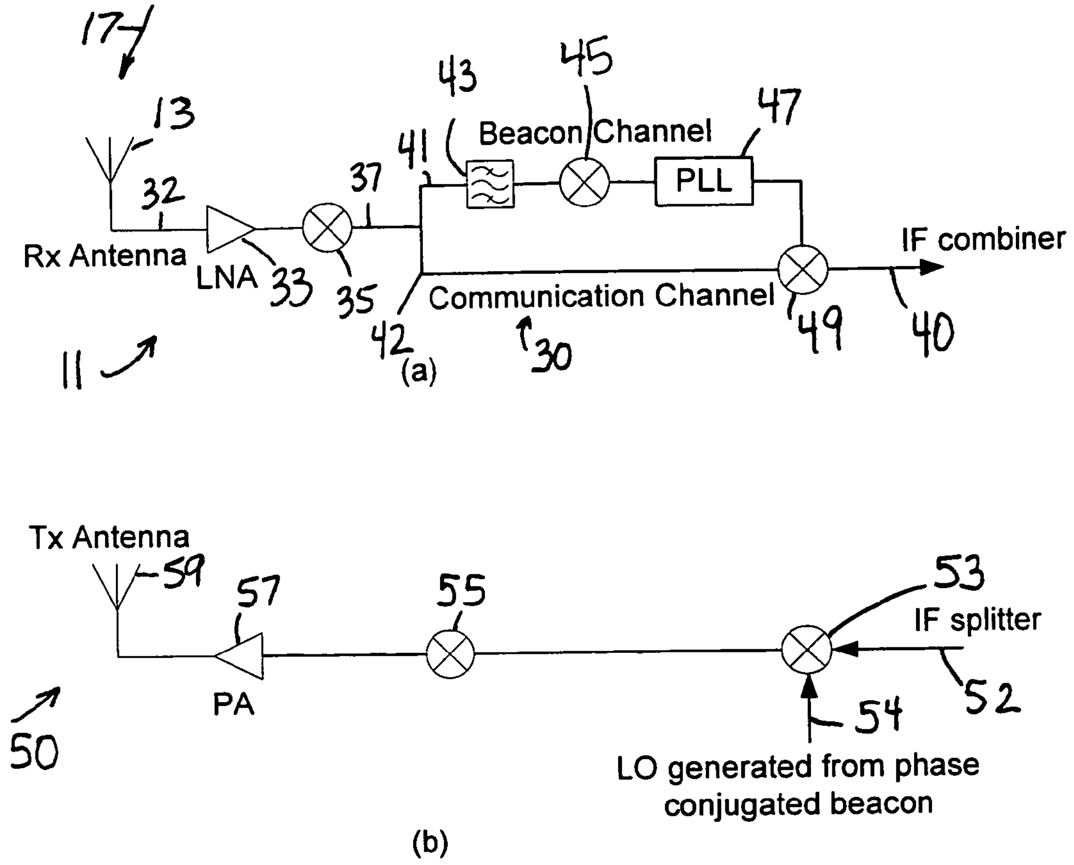
FIG. 2 shows schematic details of the receiver and transmitter circuits.
Figure 4:
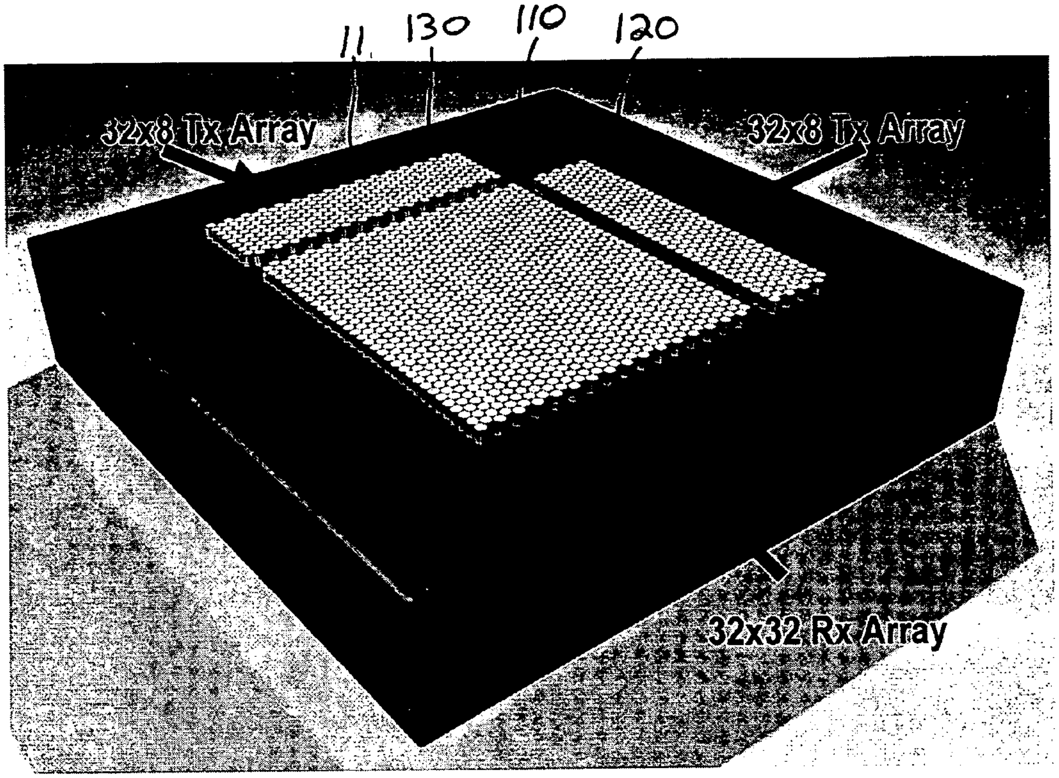
FIG. 4 shows a ground station element array.

FIG. 2 shows a detailed diagram of the circuitry at each array receiver Rx element (FIG. 4). The received beacon and RF information signals 17 are passed as combined RF signals 32 from each antenna 13, amplified by low noise amplifiers (LNA) 33 and down-converted 35 to a first intermediate frequency (IF) 37. Then, the beacon signal 41 is tapped off through a surface acoustic wave (SAW) filter 43 and used as a reference to a phase lock loop (PLL) 47 after further down-conversion by mixer 45. The down-converted beacon signal from PLL 47 is applied to the communication signal 42 in an intermediate frequency (IF) mixer 49. Because the beacon and communication signals 41, 42 are at close frequencies and come from the same angle, the phase difference between two is the same at each element of the array regardless of the angle of arrival. The geometry phase of the communication signal is removed through this mixing process 30. The IF output 40 of the mixer 49 should be at the same phase at every element of the array. Then, the signals from all the array elements can be combined in phase without any phase shifting, autonomously pointing the receiver array beam at the incoming angle of the beacon signal.

FIG. 2 shows a transmitter element 50. Information signals 52 and a local oscillator signal 54 generated from the phase conjugated satellite beacon are mixed in mixer 53. The signal is further up-converted 55, amplified 57 and fed to transmitting antenna 59, where it is autonomously redirected to the satellite that provided beacon and information signals 17.

When the frequencies of the down-converted RF and beacon signals are given by $\omega_{beacon}$ and $\omega_{RF}$, the mixing process described in the previous paragraph can be expressed with the following equations. Equations 1 and 2 show the down-conversion process.

Case (1) $\omega_{beacon}<\omega_{RF}$ $$\cos(\omega_{beacon}t+\theta_n)\cdot\cos(\omega_{RF}t+\phi_{data}(t)+\theta_n)\Rightarrow\cos((\omega_{RF}-\omega_{beacon})t+\phi_{data}(t)) \quad (1)$$

Case (2) $\omega_{beacon}>\omega_{RF}$ $$\cos(\omega_{beacon}t+\theta_n)\cdot\cos(\omega_{RF}t+\phi_{data}(t)+\theta_n)\Rightarrow\cos((\omega_{beacon}-\omega_{RF})t+\phi_{data}(t)) \quad (2)$$

where $\theta_n$ is the geometry phase at the nth element of the array. The geometry phase is successfully eliminated.

Even if a beacon is not available, the autonomous beam steering is still possible by generating an LO from the received communication signal using carrier recovery circuitry.

The geometry phase is frequency dependant. Thus, if the beacon and communication frequencies are far apart or the directivity of the array is high, the beam pointing error due to the frequency difference is no longer negligible (Equations (3) and (4)).

Case (1) $\omega_{beacon}<\omega_{RF}$ $$\cos(\omega_{beacon}t+\theta_n)\cdot\cos(\omega_{RF}t+\phi_{data}(t)+\theta'_n)\Rightarrow\cos((\omega_{RF}-\omega_{beacon})t+\phi_{data}(t)+\theta'_n-\theta_n) \quad (3)$$

Case (2) $\omega_{beacon}>\omega_{RF}$ $$\cos(\omega_{beacon}t+\theta_n)\cdot\cos(\omega_{RF}t+\phi_{data}(t)+\theta'_n)\Rightarrow\cos((\omega_{beacon}-\omega_{RF})t+\phi_{data}(t)+\theta_n-\theta'_n) \quad (4)$$

where $\theta_n$ and $\theta'_n$ are the geometry phases in the beacon and communication signals at the nth element of the array. The relationship between the geometry phases of the beacon and communication signals can be given by:

$$\frac{\theta'_n}{\theta_n} = \frac{f_{RF}}{f_{beacon}} \tag{5}$$

where $f_{Comm}$ is the communication frequency and $f_{Beacon}$ is that of the beacon (before down-conversion). Therefore the phase of the beacon can be easily adjusted using the N and R counters in the PLL circuit. The N and R counters should be set so that $$\frac{N}{R} = \frac{f_{RF}}{f_{Beacon}} \tag{6}$$

where $f_{Comm}$ is the communication frequency and $f_{Beacon}$ is that of the beacon.

The transmitter array is based on phase conjugating array technology. The phase conjugating array has the interesting characteristic that it retransmits a signal back to the direction of the beacon. The output signal from the modem is split and applied to each element of the array. In order to transmit a signal in the direction of a satellite, the transmitted signal at each element must have the conjugated phase of the received beacon signal. The phase-conjugating operation can be achieved simply using the heterodyne mixing technique. The modem output signal is up-converted using the phase-conjugated LO generated by the received beacon (Equation (7)).

$$\cos(\omega_{modem}t+\phi_{data}(t))\cdot\cos(\omega_{LO}t-\theta_n)\Rightarrow\cos((\omega_{modem}+\omega_{LO})t+\phi_{data}(t)-\theta_n) \tag{7}$$

Notice that the lower side band (LSB) of the mixing product is the phase conjugation of the LO signal and the phase will be different at each element as it depends on the phase of the received beacon signal.

Figure 3:
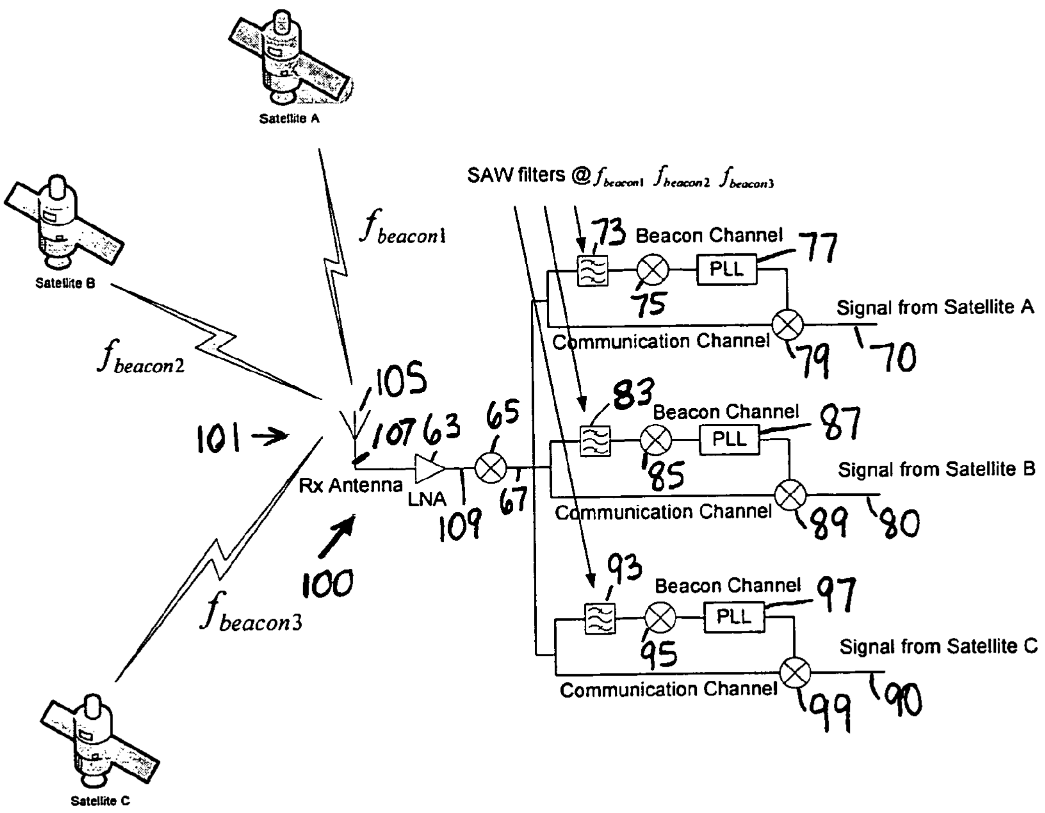
FIG. 3 shows a system diagram of a multibeam steering array using the new technique.

The invented array is capable of communicating with different satellites A, B, C simultaneously with little modification. The system diagram of the multibeam steering array is shown in FIG. 3. Signals f1, 2, 3 are received on an antenna 105 of each element 101 in an array 100. Signals 107 are amplified in a low noise amplifier 63. Amplified signals 109 are down-converted 65 to IF signals 67. A signal 1, 2, 3 received at each element of the array is split into multiple channels. Each channel has a SAW filter 73, 83, 93 with a different passband to select the beacon from one satellite and block others. Each beacon channel has a down-converting mixer 75, 85, 95 and a PLL 77, 87, 97. The down-converted signals in the communications channels are mixed with the phase signals from the PLLs in mixers 79, 89, 99. Each mixer outputs the signal 70, 80, 90 from one satellite A, B, C. A similar approach is applied to the transmitters as well.

FIG. 4 shows the autonomous beam steering array. The array size can be adjusted based on gain and frequency requirements. Each antenna element 11 in the 32×32 element main array 110 and in the 32×8 element side arrays 120, 130 has a complete antenna receiver or transmitter, which receives the combined beacon and data signals 17, and uses the beacon beam 27 to separate the data signals 42 from the beacon signals 41 in the receiver, and uses the local oscillator generated from the phase conjugated beacon signal 54 in the transmitter, as shown in FIG. 2.

The invented system can also be used in other types of mobile communications. An unmanned aerial vehicle (UAV) requires a high gain antenna due to the limited fuel or battery power on the vehicle. The new phased array can provide real-time beam control that enhances the communication link between the UAV and ground stations. Because the new system uses arbitrary frequencies within a designated band for receiving and transmitting thanks to the phase lock loop circuitry, full-duplex point-to-point communication link are established using two sets of the new arrays, enabling low-power operation of the communication system.

Figure 5:
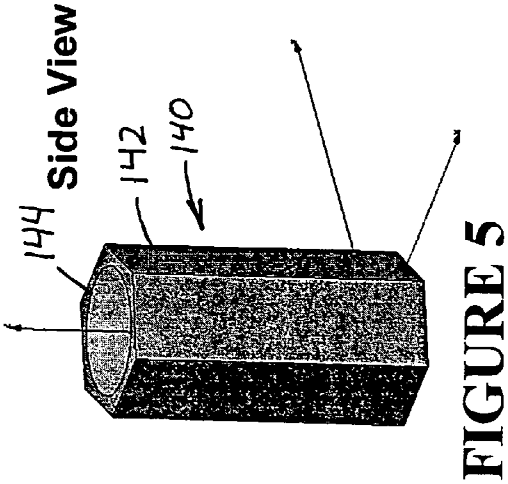
FIGS. 5, 6 and 7 are side, top and bottom perspective views of the open ended circuit waveguide antenna elements.
Figure 6:
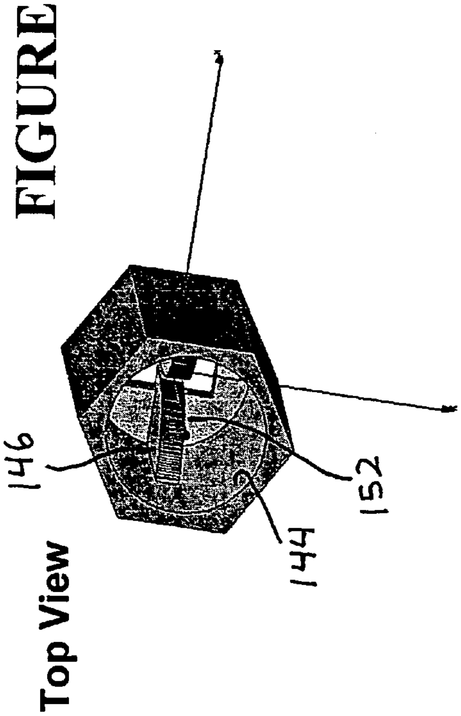
Figure 7:
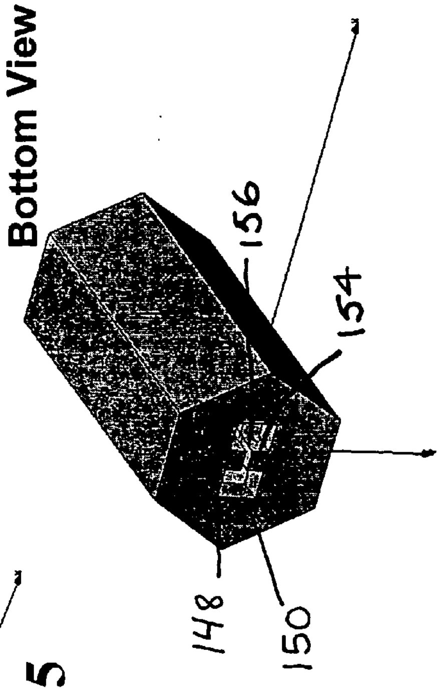

FIGS. 5, 6 and 7 are side, top and bottom perspective views of open ended waveguide antenna elements. Antenna element 140 has hexagonal external sides 142 for grouping in adjacent offset rows, and a cylindrical inner surface 144 which acts as a waveguide. A horn 146 is shown in the top. The flat base 148 has an H-shaped opening 150 for coupling with slot line elements. The sides 152 of the horn are aligned with the narrow central elements 154 of the H-shaped elements. The narrow opening 156 aligns with the space between sides 152 of horn 146.

Figure 8:
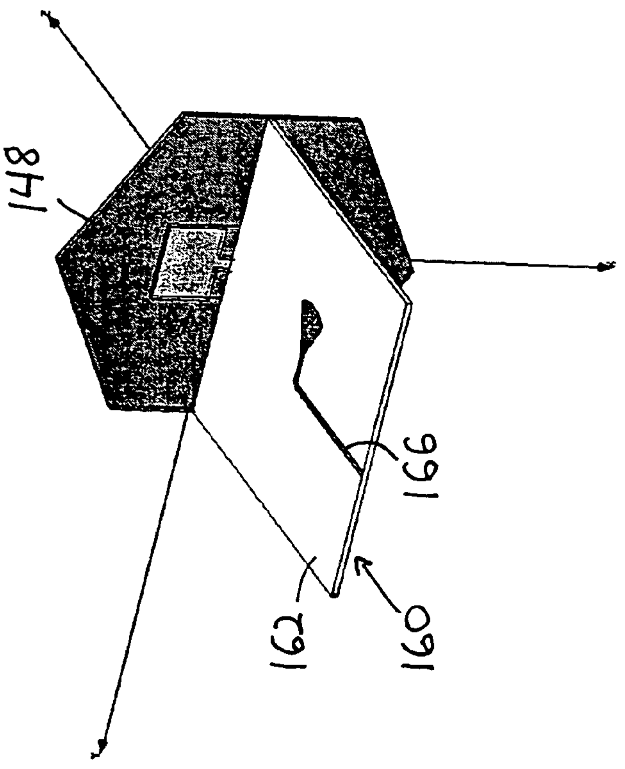
FIGS. 8 and 9 are top and bottom perspective views of the microstrip-to-slot line transitions in the element.
Figure 9:
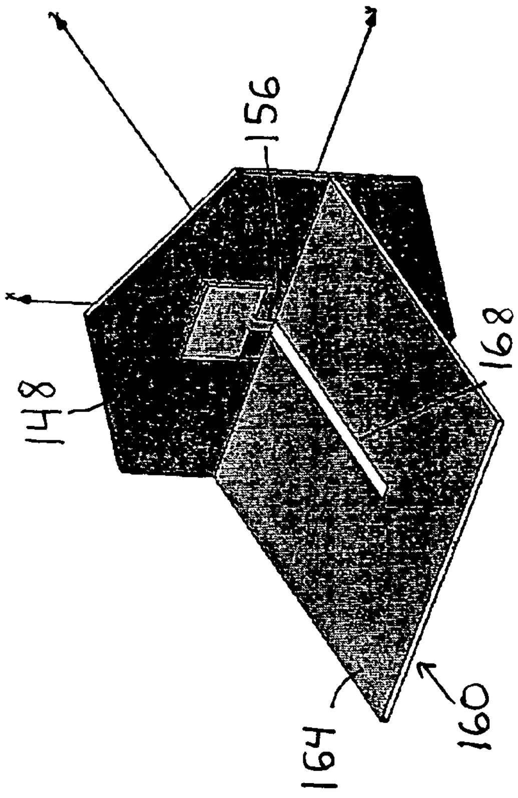

FIGS. 8 and 9 are top and bottom perspective views of the microstrip-to-slot line transitions in the element. A microstrip-to-slot transition element 160 is shown connected to the flat base 148. Transition element 160 has a top 162 and a bottom 164. The top has a microstrip transmission line 166 which is coupled to a slot line 168 aligned with the narrow opening 156 of the flat base 148.

Figure 10:
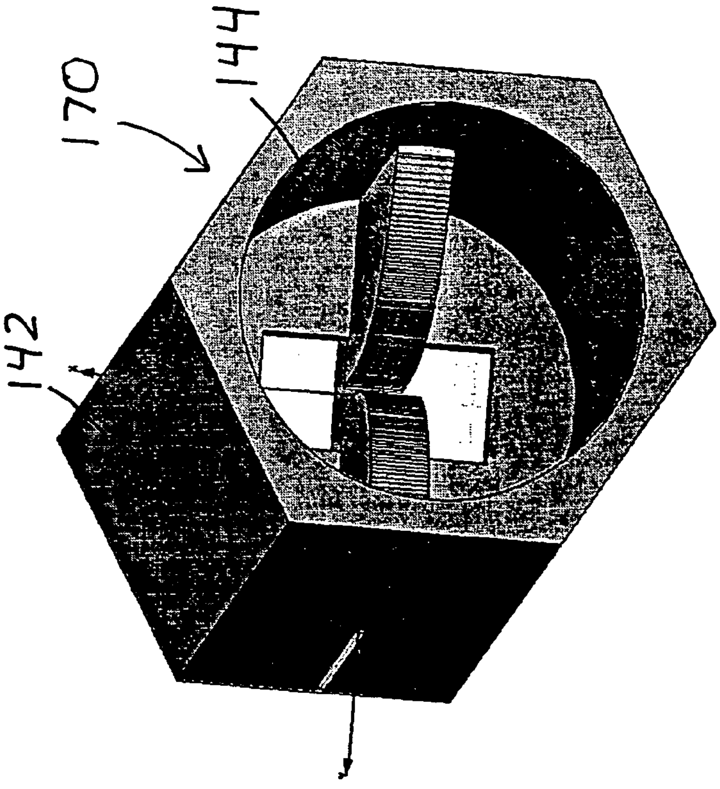
FIGS. 10 and 11 are perspective views of the antenna side and feed side of the combined structures in each antenna element.
Figure 11:
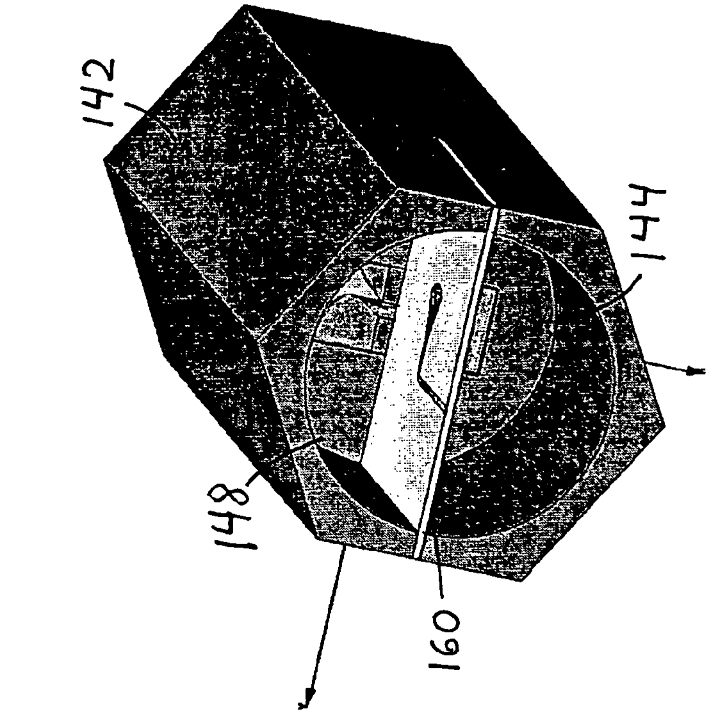

FIGS. 10 and 11 are perspective views of the antenna side and feed side of the combined structures in each antenna element. The flat base 148 is shown in the center of an extended combined structure 170 with hexagonal outer sides 142 and a cylindrical open center 144. The microstrip-to-slot transition element 160 is connected to the flat base 148 and embedded in the structure 170.

Figure 12:
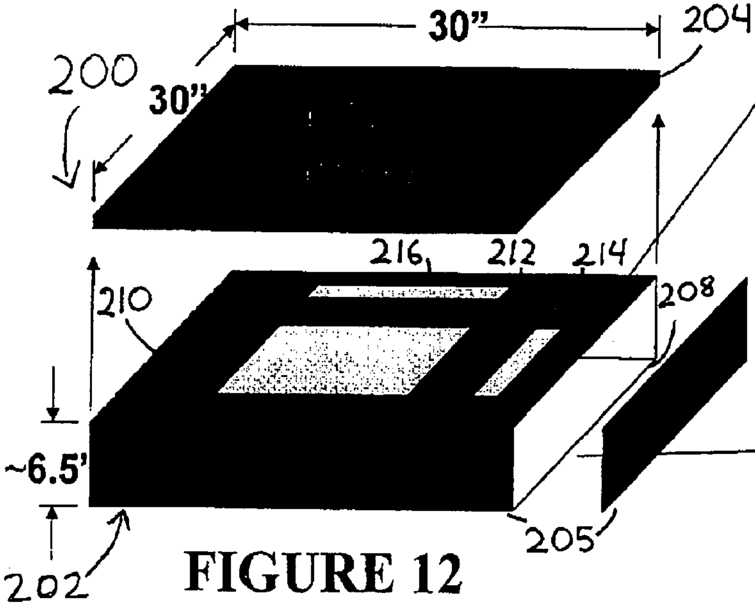
FIGS. 12 and 13 are exploded schematic views of the phased array layers in the new antenna system.
Figure 13:
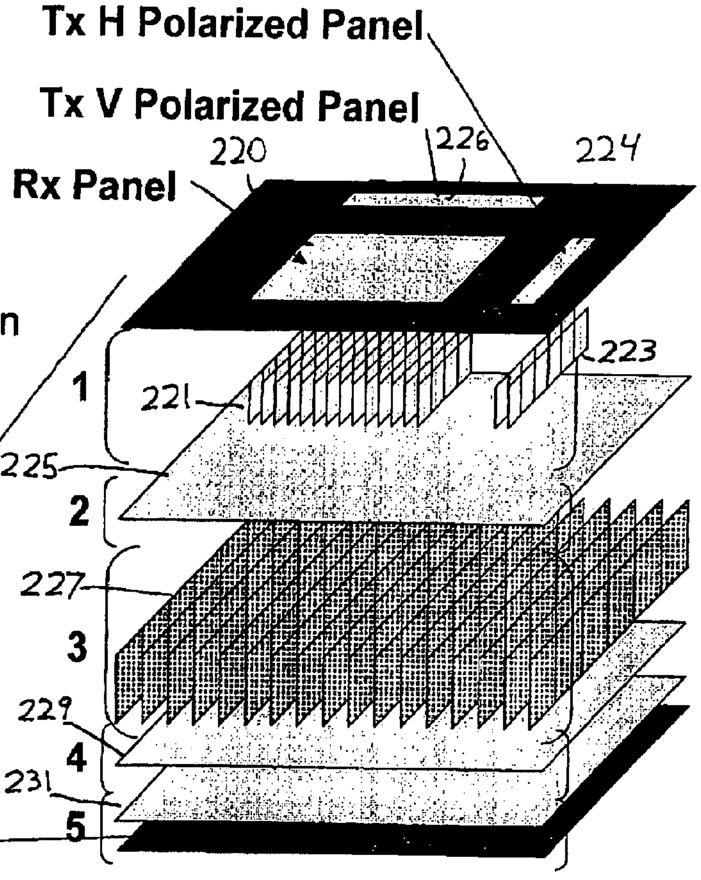

FIGS. 12 and 13 are exploded schematic views of the phased array layers in the new antenna system. An exploded antenna module 200 is schematically shown in FIG. 12. The module has a box 202 with a radio wave transmitting cover 204 and flat sides 205 and bottom 208. Top 210 has opening 212, 214, 216 for holding the receiver panel 220 and the transmitter panels 224, 226.

FIG. 13 is an exploded view of the box 202 showing its receiver panel 220 and transmitter panels 224, 226. Beneath these panels are their respective high frequency cards 221, 223. An LO and IF distribution layer 225 is between the high frequency cards 221, 223 and the receiver and transmitter IF phase aligning cards 227. Below those are the digital and power supply layer 229 and receiver IF combining and transmitter IF distribution layer 231.

Figure 14:
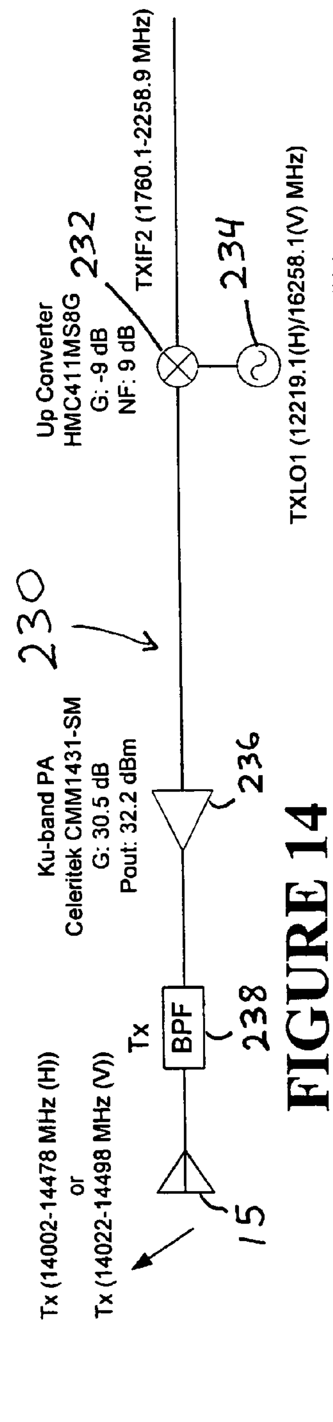
FIG. 14 is a schematic representation of a transmitter.
Figure 15:
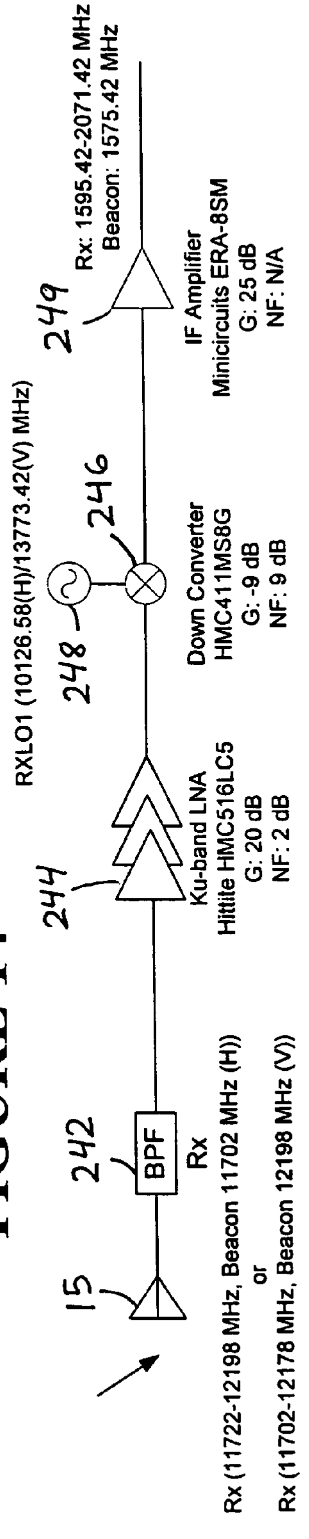
FIG. 15 is a schematic representation of a receiver.

FIG. 14 is a schematic representation of a transmitter. FIG. 15 is a schematic representation of a receiver. FIG. 14 schematically shows an alternate transmitter diagram 230. An up-converter 232 mixes an information signal with a signal from the local oscillator 234. The up-converted signal is amplified 236 and sent through a band pass filter 238 to an antenna element 15.

The receiver schematic diagram shows reception by an antenna element 15, filtering through a band pass filter 242, amplifying 244, down-converting 246 with a local oscillator 248 and amplifying 249.

Figure 16:
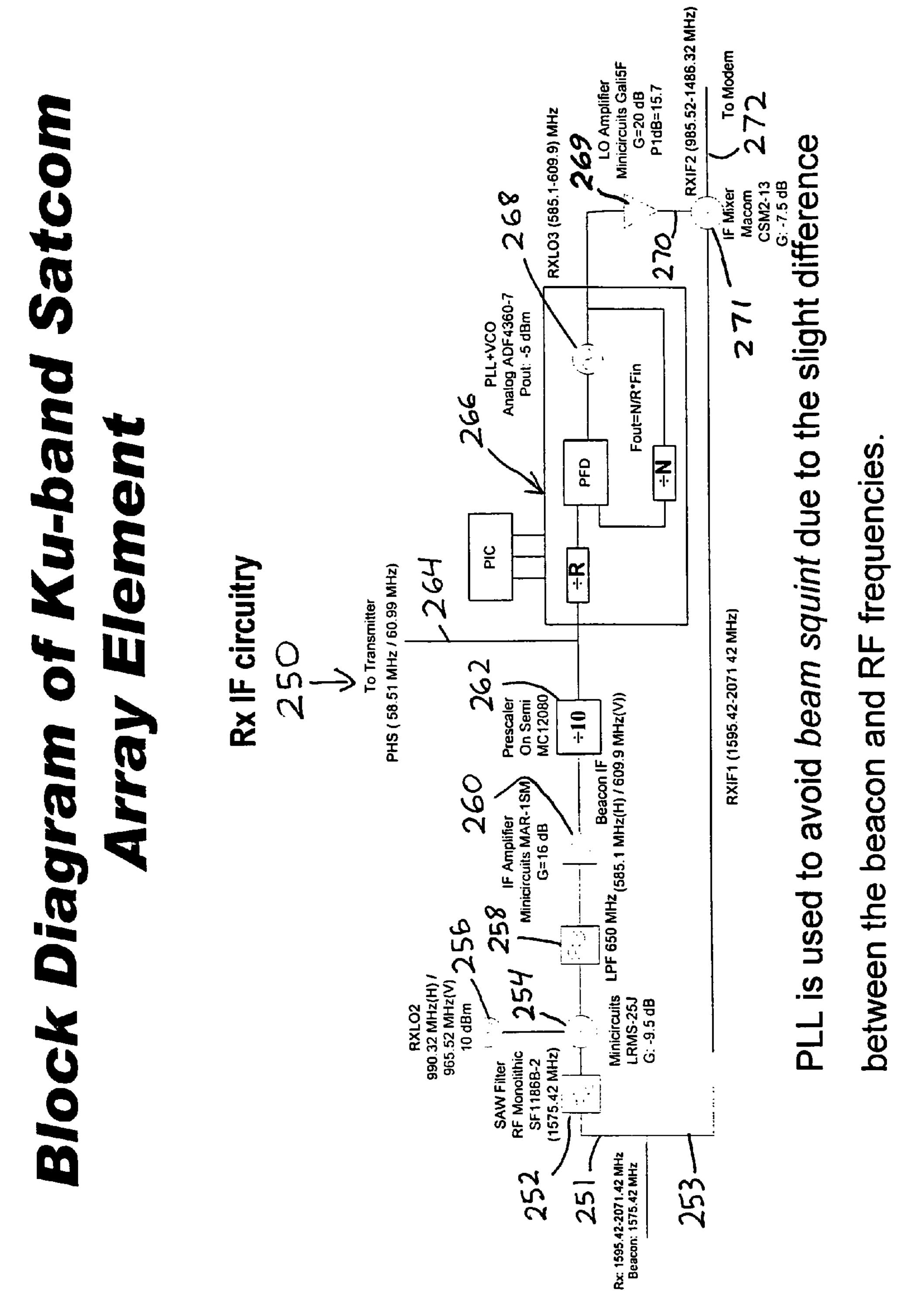
FIG. 16 is a schematic representation of a receiver element.

FIG. 16 is a schematic representation of a receiver element. An intermediate frequency receiver (Rx IF) circuitry 250 has a beacon channel 251 and a communication channel 253. A SAW filter 252 separates the beacon signal which is mixed 254 with a local oscillator 256 frequency, filtered 258, amplified 260 and divided by a prescaler 262. That signal is also provided 264 to the transmitter. A phase locked loop 266 with a voltage controlled oscillator 268 provide an amplified 269 signal 270 to the mixer 271 which provides the intermediate radio frequency information signal 272 to the modem.

Figure 17:
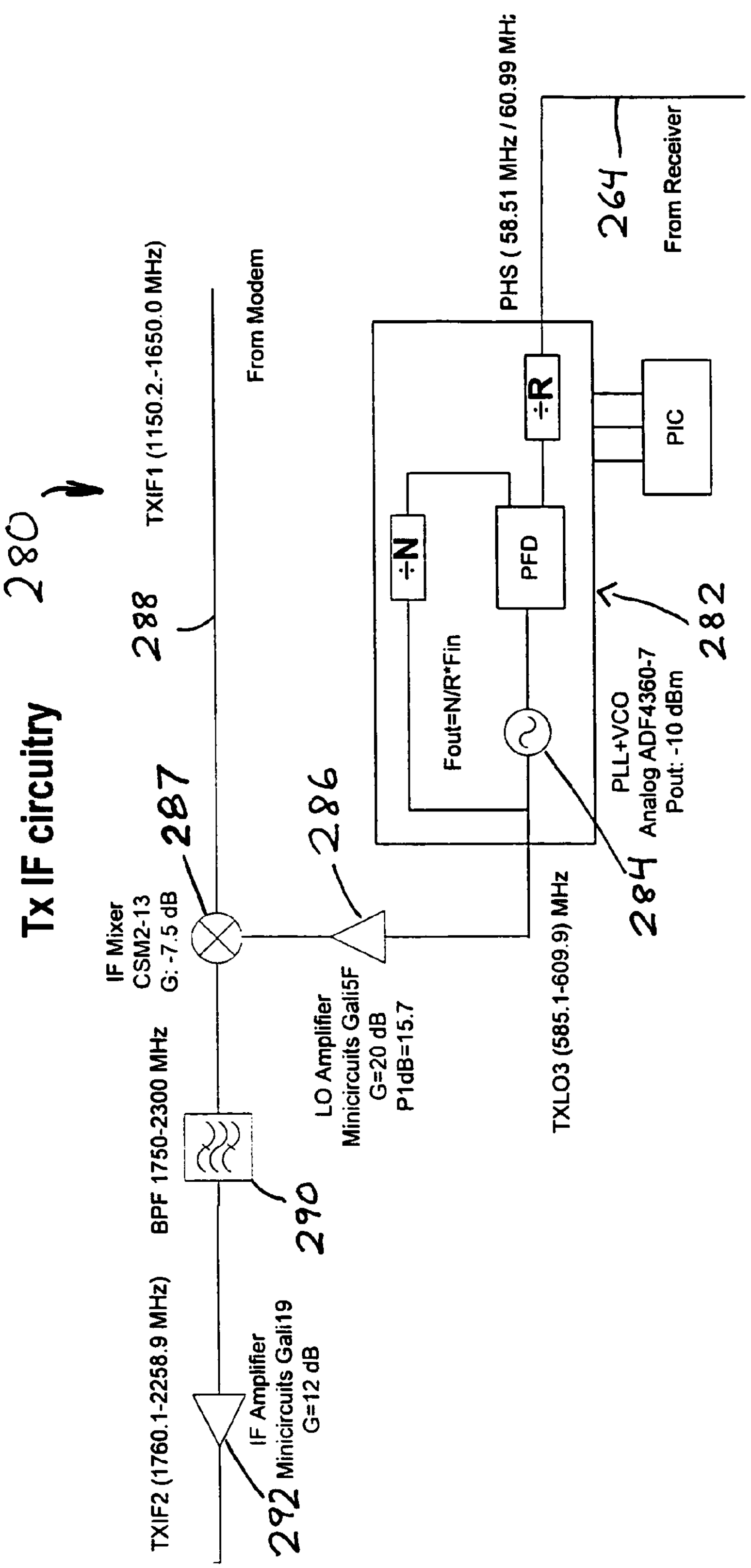
FIG. 17 is a schematic representation of a transmitter element.

FIG. 17 is a schematic representation of a transmitter element. In the transmitter 280 the frequency 264 from the receiver circuitry 250 is provided to a phase locked loop 282 with a voltage controlled oscillator 284 and is amplified 286 and mixed 287 with an information signal 288 from the modem. The resultant RF signal is passed through a band pass filter 290 and amplifier 292 to a transmitter antenna.

Figure 18:
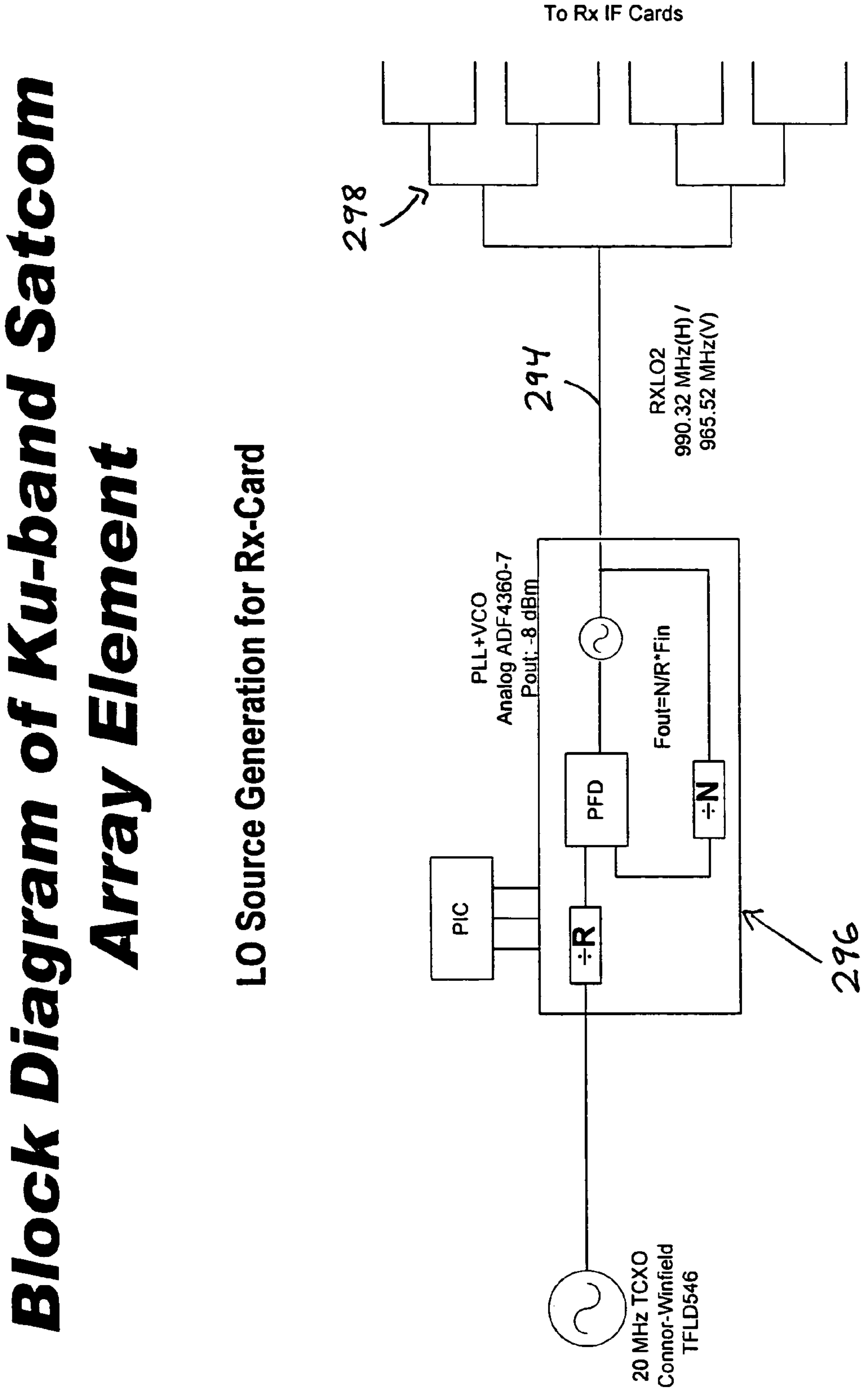
FIG. 18 is a schematic representation of local oscillator source generation for receiver elements.

FIG. 18 is a schematic representation of local oscillator source generation for receiver elements. The receiver LO source 294 is provided through a phase locked loop 296 to receiver IF cards 298.

Figure 19:
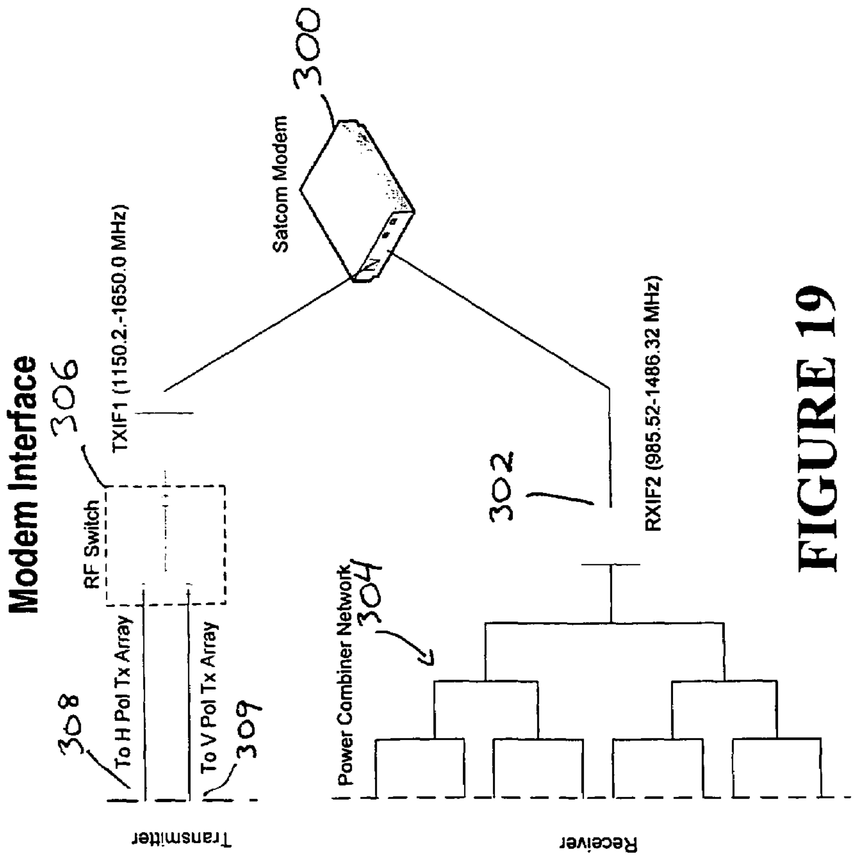
FIG. 19 is a schematic representation of receivers, transmitters and a modem.

FIG. 19 is a schematic representation of a receiver, transmitter and modem. The modem 300 receives amplified 302 IF2 frequency from a receiver power combiner network 304 and provides a transmitter IF1 frequency to an RF switch 306 for connecting the transmitter IF1 to the H polarized transmitter array 308 or to the Y polarized transmitter array 309.

The new SATCOM system can self-steer a beam toward a satellite that sends a beacon signal. This beam steering technique does not rely on any digital signal processing or algorithm to find the satellite direction. Due to that, the new technique enables agile autonomous beam steering for mobile satellite communication.

The invention has advantages over known systems in that the new satellite communications system is small and low cost and operates with no delay. The new system has multiple beam capability. It operates autonomously and in real time. Geometry phase of the signals are cancelled by mixing the beacon and radio frequency information signals. The new system provides retrodirection to satellites by mixing the satellite beacon with the radio frequency transmitter signal. The phase conjugation enables retrodirection from the transmitter.

The new satellite communications system uses open ended circular wave guide antennas having microstrip-to-slot line transition feeds combined with the antenna structure.

The receiver and transmitter antennas have low return losses in the satellite communication GHz bands.

The transmitter meets Transmit Sidelobe Mandatory Requirements for Intelsat Standard E Antennas. The system meets planned requirements of transmitting 1544 kbps at 3/4 rate from the hub and 512 kbps at 3/4 rate inbound from remotes. QPSK full duplex is provided and required uplink EIRP of 79.6 dBm is met. One watt of power in each element with 8 rows of 32 elements per row is sufficient to achieve the required EIRP.

Advantages of the new satellite communications system include: a flat architecture, the fact that the use of a beacon to generate LO eliminates the need for direction finding, allowing real time agile autonomous beam standing, no need for complicated high-frequency LO networks, a modular design that makes it easy to increase or decrease the array size, beam steering at low frequency, which makes possible the use of economical COTS ICs, no phase shifters, which leads to a reduced overall cost, and possible multi-beam control, allowing communication with several satellites simultaneously.

While the invention has been described with reference to specific embodiments, modifications and variations of the invention may be constructed without departing from the scope of the invention, which is defined in the following claims.

We claim:

1. A method of autonomously steering transmitted beams of signals comprising:

receiving incoming signals from an unknown direction, mixing the incoming signals, determining phases of the incoming signals, creating uplink signals in transmitters, mixing the return signals with incoming phase determinations, and transmitting the return signals in the direction of the incoming signals from transmitting antennas thereby autonomously steering the beams of signals in real-time.

2. A method of autonomously steering transmitted beams of signals comprising:

receiving incoming signals from an unknown direction, processing the incoming signals, determining phases of the incoming signals, creating uplink signals in transmitters, mixing the return signals with incoming phase determinations, and transmitting the return signals in the direction of the incoming signals from transmitting antennas, wherein the receiving the incoming signals further comprises separating beacon frequencies from information signal frequencies, conducting the beacon frequency in a beacon channel and conducting the information signal frequency in a communication channel, subjecting the separated beacon frequencies to a voltage controlled oscillator and a phase locked loop in the beacon channel of a beacon signal and mixing the beacon signal and an information signal, wherein the creating uplink signals and the mixing uplink signals with incoming phase determinations further comprises mixing local oscillator signals generated from the beacon signal with uplink information signals from an intermediate frequency signal splitter.

3. A method of autonomously steering transmitted beams of signals comprising:

receiving incoming signals from an unknown direction, processing the incoming signals, determining phases of the incoming signals, creating uplink signals in transmitters, mixing the return signals with incoming phase determinations, and transmitting the return signals in the direction of the incoming signals from transmitting antennas, wherein the processing further comprises amplifying the signals with a low noise amplifier, down-converting the incoming signals to a lower frequency, tapping of a beacon signal in the incoming signals through a SAW filter into a beacon channel, further down-converting the beacon signal to apply to a phase locked loop integrated with a voltage controlled oscillator, and forming a LO signal with the beacon phase, mixing the phase beacon signal with the incoming signal in a communication channel and transferring the mixed signals to an intermediate frequency combiner.

4. The method of claim 3, wherein the creating uplink signals comprises creating the uplink signals at an intermediate frequency, splitting the intermediate frequency, generating local oscillator signals from a phase conjugated beacon signal, mixing the local oscillator signals with the uplink signals, up-converting the uplink intermediate frequency signals, amplifying the up-converted uplink signals, and transmitting the uplink signals in the transmitting antennas.

5. The method of claim 1, wherein the receiving comprises receiving the incoming signals in multiple receiving antennas in a close receiving antenna array, wherein the processing comprises processing the incoming signals in multiple receivers and wherein the creating, mixing, and transmitting of the uplink signals comprises multiple creating, mixing, and transmitting in multiple transmitters and transmitting antennas.

6. The method of claim 5, wherein the multiple receiving antennas are fixed in a fixed receiving antenna array and wherein the multiple transmitting antennas are fixed in fixed transmitting antenna arrays.

7. The method of claim 6, wherein the fixed transmitting antenna arrays are two rectangular arrays which are orthographically arranged.

8. An autonomous beam steering system comprising a receiver array having receivers and receiving antennas for receiving downlink signals, transmitter arrays having transmitters and transmitting antennas for directing uplink signals in a direction of the incoming beacon signal, the receivers having receiver components for eliminating angle dependency, mixed signals provided by the components and separated signals provided by the components, the transmitters having transmitter components for adding directional features to the uplink signals for steering a beam of the uplink signals in a direction of the incoming beacon signal.

9. An autonomous beam steering system comprising a receiver array having receivers and receiving antennas for receiving downlink signals transmitter arrays having transmitters and transmitting antennas for directing uplink signals in a direction of the incoming beacon signal, the receivers having receiver components for eliminating angle dependency, the transmitters having transmitter components for adding directional features to the uplink signals for steering a beam of the uplink signals in a direction of the incoming beacon signal, wherein the receivers have low noise amplifiers connected to the receiving antennas and down-converters connected to the low noise amplifiers, beacon channels and communications channels connected to the down-converters, SAW filters, second down-converter and phase locked loop circuits serially connected in the beacon channel, mixers connected to the communication channel and the beacon channel for mixing outputs of the channels and an intermediate frequency combiner for combining an intermediate frequency with the mixed output.

10. The system of claim 9, wherein the transmitter components further comprise an IF signal splitter, a local oscillator generating a signal from the phase conjugated beacon signal, an up-converter, an amplifier, and a transmitting antenna.

11. The system of claim 8, wherein the receivers receive the incoming signals in multiple receiving antennas in a close receiving antenna array, wherein the incoming signals are processed in multiple receivers and wherein the uplink signals are created, mixed, and transmitted in multiple transmitters and transmitting antennas.

12. The system of claim 11, wherein the multiple receiving antennas are fixed in a fixed receiving antenna array and wherein the multiple transmitting antennas are fixed in fixed transmitting antenna arrays.

13. The system of claim 12, wherein the fixed transmitting antenna arrays are two rectangular arrays which are orthographically arranged.

14. Real-time autonomous beam steering apparatus comprising:

a receiver for receiving inbound beams from supply sources, the inbound beams comprising signals along an incident direction, a transmitter for transmitting outbound signals along the incident direction, the receiver comprising mixers signals in the inbound beams and further comprising separators for separating, splitting and phase-conjugating the signals in the inbound beams and providing output signals to the transmitter, and the transmitter comprising devices for mixing the output signals supplied by the receiver and transmitting outbound signals.

15. The apparatus of claim 14, wherein the receiver comprises one or more receiver arrays, and wherein the plural signals comprise beacon signals and data signals.

16. The apparatus of claim 15, wherein each receiver array of the one or more array elements comprises the said mixers for mixing and down converting the beacon signals and the data signals at one or more stages prior to and after the separating of the beacon signals, and wherein each receiver array of the one or more receiver arrays comprises the said separators for separating the beacon signals from the data signals.

17. The apparatus of claim 16, wherein said each receiver array comprises receiver antenna for receiving the inbound beams.

18. The apparatus of claim 15, wherein the transmitter comprises one or more transmitter arrays.

19. The apparatus of claim 18, wherein each transmitter array of the one or more transmitter arrays comprises the said devices, and wherein the said devices include additional mixers for mixing and up converting the beacon signals and the data signals and forming the outbound signals.

20. The apparatus of claim 19, wherein said each transmitter array further comprises transmitting antenna for autonomously transmitting and redirecting the outbound signals along the incident direction back to the supply sources supplying the inbound beams.

* * * * *